Patented Mar. 29, 1927.

1,622,731

UNITED STATES PATENT OFFICE.

ANTHONY MOULTRIE MUCKENFUSS, OF WOODBRIDGE, NEW JERSEY, ASSIGNOR TO THE ROESSLER & HASSLACHER CHEMICAL CO., OF NEW YORK, N. Y., A CORPORATION OF NEW YORK.

PROCESS FOR PRODUCING AQUEOUS SOLUTIONS OF FREE CYANAMID.

No Drawing.   Application filed August 14, 1924.   Serial No. 731,985.

Calcium cyanamid has been for a long time a well known article of commerce. Free cyanamid, however, is not so well known. The literature describes several methods of preparing it, but the processes outlined are not adaptable for large scale production at a reasonable cost. One method proposes neutralization of commercial calcium cyanamid with weak acids, such as acetic acid, and extracting the dried material obtained; another proposes neutralization of the water solution or suspension of calcium cyanamid by strong acids; still another neutralization with carbon dioxide. The disadvantages of all these processes are either that they result in small yields of free cyanamid or that the equipment is expensive and difficult of control.

If the reaction by the above processes becomes too acidic, the cyanamid is hydrolyzed to urea:

$$CN.NH_2 + H_2O = CO(NH_2)_2$$

and the urea may hydrolyze further to ammonium carbonate, the latter being decomposed by acids:

$$CO(NH_2)_2 + 2H_2O = (NH_4)_2CO_3$$

If the reaction becomes too alkaline and under some conditions of acidity, the cyanamid polymerizes to dicyandiamid:

$$2CN.NH_2 = C_2N_4H_4$$

If the temperature rises too high, both the above reactions are considerably accelerated, and if the solution is not acidic, some of the calcium cyanamid acts as if it hydrolyzes to calcium carbonate and ammonia:

$$CaCN_2 + 3H_2O = CaCO_3 + 2NH_3$$

In neutralization with acetic acid, if much water is present, the calcium acetate formed dissolves and cannot be easily separated from the cyanamid. If little water is present, there is unavoidable local over-heating. In neutralization with strong acids, such as sulphuric acid, it is practically impossible to prevent excessive acidity in the water solution of calcium cyanamid and too great a rise in temperature. In neutralization with carbon dioxide, the reaction is so slow at ordinary pressure that it is difficult to prevent local alkalinity in the solution with consequent cutting down of yield. If carbon dioxide is run into the calcium cyanamid solution or suspension under pressure, the apparatus necessary is complicated and difficult to operate.

My invention obviates all the above difficulties by simply passing sulphur dioxide gas or mixed gases containing sulphur dioxide or introducing sodium or calcium bisulphite or other soluble bisulphites at proper rate into a suspension or solution of powdered commercial calcium cyanamid in water in a suitable vessel, for example, in an ordinary jacketed kettle with a good mechanical agitator, the kettle being sufficiently cooled with running water. The reaction between the sulphur dioxide and calcium cyanamid is very rapid, so that there is no need of pressure. First, the sulphur dioxide forms sulphurous acid with the water present:

$$SO_2 + H_2O = H_2SO_3$$

This then reacts with the calcium cyanamid:

$$CaCN_2 + H_2SO_3 = CN.NH_2 + CaSO_3$$

Sulphur dioxide, being an acidic gas, forming sulphurous acid with water, as above shown, there is no trouble as to the reaction becoming alkaline. Sulphurous acid being a weak acid, the rise in temperature is not beyond control. For the same reason, the acidity will not be very great under the most adverse conditions and is easily controlled by regulating the flow of sulphur dioxide and by use of a proper indicator such as phenolphthalein or testing the filtered solution for calcium bisulphite, which is very soluble, while the neutral calcium sulphite is insoluble in water. All of the calcium is to be finally precipitated in the latter form.

Even if more sulphur dioxide is added than necessary at any time to form the insoluble sulphite with the calcium from the calcium cyanamid, the excess merely forms calcium bisulphite instead of calcium sulphite. This bisulphite is formed when too much sulphur dioxide is being supplied for the capacity of the kettle and too much in proportion to the efficiency of agitation and cooling:

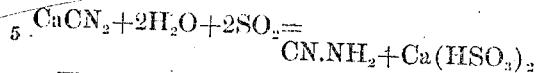
$$CaCN_2 + 2H_2O + 2SO_2 = CN.NH_2 + Ca(HSO_3)_2$$

The calcium bisulphite, so formed, is eventually used up in the reaction, just as sulphur dioxide or sulphurous acid:

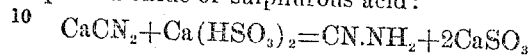
$$CaCN_2 + Ca(HSO_3)_2 = CN.NH_2 + 2CaSO_3$$

The soluble calcium bisulphite is a partially neutralized sulphurous acid, and by its formation it acts as a buffer against too great acidity. The sodium or calcium bisulphite or other soluble bisulphites are still acidic enough so that they may be used as reagents for liberating free cyanamid from calcium cyanamid, if desired.

The calcium sulphite finally formed remains as an easily filtered precipitate along with the insoluble impurities of the commercial calcium cyanamid, and the free cyanamid goes into solution in the water supplied. As the calcium cyanamid in powdered form, or its water solution, is added to the water being treated with the sulphur dioxide, as above explained, there will come a stage when the slurry will be too thick for further agitation. At this stage, the contents of the kettle are tapped off and filtered, and the filtrate and washings returned to the kettle for a second continuous treatment with more calcium cyanamid in powdered form or in water solution, and more sulphur dioxide. This procedure is repeated until maximum concentration of free cyanamid in proportion to yield is obtained in water solution.

The solution of free cyanamid thus produced will be practically pure and a strength of approximately 13½% of $CN.NH_2$ may easily be obtained. Higher concentrations can be prepared, if desired. During the operation of the process, the acidity should be held down close to neutrality. Absolute neutrality is that condition of a solution at which the concentration of the hydrogen and hydroxyl ions is the same, i. e. $10^{-7}$. However, it is not necessary that I maintain exactly this neutrality. Due to the fact that phenolphthalein changes at $P_H 9$ or rather over a range from $P_H 8$ to $P_H 10$ it is very suitable as an indicator for weak acids and I prefer to use its color change as my point of approximate neutrality during the reaction, preferably maintaining the solution just on the acid side.

As simple examples of my invention I shall now describe two experiments which I made, which illustrate one method of carrying out my process.

*Example I.*—400 cc. of water were maintained at not over 40° C., as above described, and a total of 210 grams of calcium cyanamid, 60% pure, powdered to 50 mesh, was added in four stages, 52.5 grams at each stage, with filtration and return of filtrate and washings after each stage, sulphurous acid in form of sulphur dioxide having been added to complete precipitation of the calcium as neutral sulphite during each stage. The first filtrate contained 6.74% $CN.NH_2$; the second, 9.29%; the third, 12.03%; and the fourth filtrate contained 13.5% of $CN.NH_2$. The precipitate in each stage occluded about 50 cc. of water and the precipitate in each stage was washed with about 50 cc. of water, to bring the volume of the filtrate to 400 cc.

*Example II.*—With the same quantities and method of operation as in Example I, except that the calcium cyanamid was added in five stages instead of four, 42 grams to a stage, the first filtrate contained 4.35% $CN.NH_2$; the second 8.4%; the third, 10.85%; the fourth, 12.35%; and the fifth filtrate contained 13.5% $CN.NH_2$.

I do not limit myself to any particular proportion of calcium cyanamid to water used, nor to any specified temperature or degree of acidity. The more water used, the lower will be the temperature. The lower the temperature and the acidity, the better will be the yield of $CN.NH_2$. The more efficient the agitation, the higher will be the maximum per cent $CN.NH_2$ obtainable in the last filtrate and the better will be the yield of $CN.NH_2$, based on $CaCN_2$ in the raw material. I do not limit myself to any particular degree of fineness of the calcium cyanamid powder. If powdered too fine, the reaction may proceed too fast; if not powdered sufficiently fine, too great agitation will be required to maintain a suspension in water.

It has already been explained that sulphur dioxide, though very convenient to use, does not take part as such in the chemical reactions involved in my invention, since it is changed almost at once to sulphurous acid upon coming in contact with water and since hydrogen is necessary to any reaction that forms cyanamid:

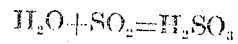
$$H_2O + SO_2 = H_2SO_3$$

The equation:
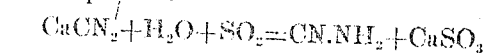
$$CaCN_2 + H_2O + SO_2 = CN.NH_2 + CaSO_3$$

may be written:
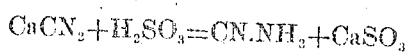
$$CaCN_2 + H_2SO_3 = CN.NH_2 + CaSO_3$$

If sodium bisulphite is used as a source of sulphurous acid there will be required 1.625 times as much sodium bisulphite by weight as of sulphur dioxide. The equation illustrating its use is as follows:

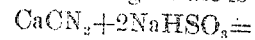
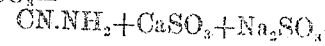
$$CaCN_2 + 2NaHSO_3 = CN.NH_2 + CaSO_3 + Na_2SO_3$$

It is obvious that in practising my invention, I do not need to limit myself to the use of any particular source of sulphurous acid. Therefore, in the appended claims, treatment with sulphurous acid is to be interpreted as including the introduction of sulphurous acid in the form of the gas sulphur dioxide, the use of solutions containing dissolved sulphur dioxide or sulphurous acid, or of solutions of acid sulphites.

Only standard equipment is required in the operation of my process. This includes means to be provided for so distributing the gaseous sulphur dioxide or the solution of sulphurous acid as to avoid excess local acidity in the calcium cyanamid slurry and means to be provided for adding the calcium cyanamid to the water used, so as to avoid excess local alkalinity in the slurry thus produced.

I do not limit myself to the use of calcium cyanamid since I can operate with the cyanamid of any other metal, whose neutral sulphite is insoluble in water.

What I claim is:

1. The process of producing a solution of cyanamid consisting in treating a solution of metal cyanamid with sulphurous acid under such conditions that the liquid remains substantially neutral in reaction and metal sulphite is precipitated.

2. The process, consisting in treating a metal cyanamid solution with sulphurous acid at such rate and at such temperature while maintaining the solution substantially neutral as to form cyanamid in solution and precipitate the metal sulphite.

3. The process of producing a solution of cyanamid consisting in treating a solution of calcium cyanamid in water with sulphurous acid, filtering and washing the precipitate, and treating the combined filtrate and washings with fresh supplies of calcium cyanamid and sulphurous acid until a filtrate of the desired concentration of $CN.NH_2$ has been obtained.

4. The process of producing a solution of cyanamid consisting in passing sulphur dioxide into a solution of calcium cyanamid in water at such a rate that the liquid remains substantially neutral in reaction, filtering and washing the precipitate, and treating the combined filtrate and washings with fresh supplies of calcium cyanamid and sulphur dioxide, until a filtrate of the desired concentration of $CN.NH_2$ has been obtained.

5. The process of producing a solution of cyanamid consisting in passing sulphur dioxide into a solution of calcium cyanamid in water that is being cooled and agitated, at such rates that the liquid remains substantially neutral in reaction, then filtering and washing the precipitate and treating the combined filtrate and washings with fresh supplies of calcium cyanamid and sulphur dioxide, until a filtrate of the desired concentration of $CN.NH_2$ has been obtained.

6. The process of preparing cyanamid consisting in treating a metal cyanamid and water with sulphurous acid, separating the solution from the precipitated metal sulphite, and treating the solution with additional metal cyanamid and acid.

7. The process of concentrating a solution of cyanamid, which consists in forming cyanamid in solution and a precipitate, separating the solution, treating the solution with a metal cyanamid and sulphurous acid, and separating the precipitate.

Signed at Perth Amboy in the county of Middlesex and State of New Jersey this 8 day of August A. D. 1924.

ANTHONY MOULTRIE MUCKENFUSS.